Patented Dec. 14, 1948

2,456,525

UNITED STATES PATENT OFFICE 2,456,525

SUPPORTED SODIUM CATALYST AND PREPARATION THEREOF

George Alexander Mills, Swarthmore, Pa., assignor to Houdry Process Corporation, Wilmington, Del., a corporation of Delaware No Drawing. Application February 6, 1947, Serial No. 726,957

6 Claims. (Cl. 252—204)

The present invention relates to improved preparations and contact masses for use in reactions requiring metallic sodium. More particularly the invention is concerned with improved methods for the ready formation of metallic surfaces of sodium in clean, highly active form.

Metallic sodium is known in the art as a catalyst in hydrocarbon polymerization reactions such as in the mass polymerization of conjugated diolefins particularly for the production of synthetic rubber. In such processes the characteristics of the sodium contact surface is of utmost importance in determining the course and efficiency of the reaction. The sodium metal being in solid form and extremely active, readily picks up impurities, such as oxygen, even when present in smallest amounts, thus impairing the catalytic activity of the surface or otherwise interfering with the desired polymerization reaction.

In the conventional practice of preparing metallic sodium contact masses, iron combs or rods are dipped into a molten sodium bath, thereafter withdrawn and coated with paraffin. The thus coated combs or rods are then transferred to the reaction vessel in which the polymerization of the unsaturated hydrocarbon is to be carried out. The paraffin coating protects the sodium surface against deterioration, as by oxidation, and to expose the sodium surface for use in the reactor it is necessary to remove the protective covering in an atmosphere of inert or reducing gas. In the use of this involved technique, considerable care must be exercised in the preparation of the contact surface and even then extreme difficulty has been experienced in obtaining good results.

I have discovered that metallic sodium surfaces of controllable thickness, in highly active state and free from deleterious contaminants can be readily prepared by a comparatively simple procedure of depositing the sodium on a non-porous surface from a solution of the metallic sodium in liquid ammonia. In accordance with the invention, the deposition of the sodium on the supporting surface can be effected directly in the vessel in which a desired chemical reaction, such as polymerization, is to be subsequently carried out, thereby further reducing the possibility of contamination.

In accordance with a preferred embodiment a non-porous supporting mass presenting an extensive surface area, such as glass wool, is provided in a closed reaction vessel. The solution of sodium in liquid ammonia is introduced into the vessel and permitted to coat the walls of the vessel as well as the supporting mass. The ammonia is then permitted to evaporate and withdrawn from the vessel, precaution being taken to avoid introduction into the vessel of air or moisture. The thickness of the sodium deposit can be controlled by selecting the required concentration of sodium in the ammonia solution.

Any inert non-porous surface can be employed on which to deposit the metallic sodium, which surface may be provided by the interior walls of the reaction vessel itself; however, in order to obtain a maximum contact surface it is preferred to employ materials offering a more extensive surface, such as non-porous, non-reactive fibrous, filamentous or finely granular materials (generally below 200 mesh and preferably not above about 50 micron size). In reactions wherein the more highly extended surface area provided by these materials is not required, the deposit of sodium on the walls of the reaction vessel alone may suffice or may be supplemented by the inclusion of rods, wires or pellets of suitable material for deposition of sodium thereon. The surface to be coated may be of any non-porous material which does not react with sodium or the ammonia solution, such as glass, glazed porcelain, quartz sand, or metal.

The contact surfaces of metallic sodium as above prepared can be advantageously employed in known reactions for polymerization of conjugated diolefins or other unsaturated hydrocarbons employing metallic sodium catalyst, such as in the mass polymerization of isoprene or butadiene. By controlling the conditions including the temperature, rate, and extent of polymerization, various polymerization products can be obtained ranging from more or less viscous drying oils through tacky semi-solids to solid rubberlike materals.

Example I

A solution comprising approximately 100 ml. of anhydrous liquid ammonia and 26 grams of sodium (enough to saturate the $NH_3$) was introduced into a glass reaction tube 1.2 cm. inside diameter and 110 cm. long, of which length 100 cm. was filled with firmly packed very fine glass wool. After the tube had been completely filled with the solution, free liquid was drained off (in the absence of any hydrating or oxidizing material). From the solution remaining on the packing and vessel walls, the ammonia was evaporated leaving a thin uniform coating of metallic sodium on all the exposed surface within the tube.

The hydrocarbon charge stock was a blend of

75% by volume of benzene (sodium dried) and 25% by volume of freshly distilled butadiene. This blend was charged to the reaction vessel at the approximately constant rate of 0.71 cc. per minute for 358 minutes with product removal regulated to a constant operating pressure of 200 lbs. per square inch gauge. The reaction temperature was maintained at 150 to 160° F. by circulation of 170 to 175° F. water through a jacket surrounding the reaction tube.

The product was combined in several cuts, of which cut No. 4, representing operation from 220 minutes to 265 minutes, was fairly representative. An A. S. T. M. distillation was as follows:

| | Degrees F. |
|---|---|
| Int | 101 |
| 5 | 127 |
| 10 | 159 |
| 20 | 172 |
| 30 | 174 |
| 40 | 175 |
| 50 | 176 |
| 60 | 176 |
| 70 | 176 |
| 80 | 179 |

90, 95, Resin residues after 88% dist.

Approximately 35% of unsaturates in the original charge stock were polymerized to heavy oil which had the characteristic nature of a drying oil.

*Example II*

Another run with freshly prepared sodium catalyst was made in the same vessel with the same charge and conditions except that the temperatures were about 180° to 190° F. with run time of 288 minutes. The percent of unsaturates reacting was 74%. The reaction product was a heavy drying oil which dried to a hard smooth lacquer-like finish.

*Example III*

Another run was made similar to that in the first example except that the rate of charge was approximately 4.0 cc. per minute and the duration of the run was 368 minutes. Reaction of the unsaturates during the first hour was about 15%, during the second hour about 10%, during the third hour about 5%, during the fourth hour about 3.5%. Maximum conversion during this run was 19.5%. The product was a less viscous drying oil than obtained in the preceding example.

Metallic sodium has other well known uses in addition to that of a catalyst. For instance it has been employed in some chemical reactions as a reducing agent, and also as a reactant in organic syntheses, for example in reactions with organic halides as in the classical Fittig and Wurtz syntheses. The provision of metallic sodium surfaces free from interfering contaminants may also be found advantageous in connections with these reactions.

Obviously many modifications and variations of the invention as hereinbefore set forth may be made without departing from the spirit and scope thereof and therefore only such limitations should be imposed as are indicated in the appended claims.

I claim as my invention:

1. The process of preparing active surfaces of substantially pure metallic sodium which comprises treating an inert non-porous material with a solution of sodium in liquid ammonia, and evaporating the ammonia, while preventing access of air and moisture to the treated material during evaporation.

2. The process of claim 1 in which said inert non-porous material is glass wool.

3. The method of preparing metallic sodium surfaces for use in catalytic reactions which comprises providing an inert non-porous supporting mass of extensive surface area in a closed reactor, depositing a film of metallic sodium on said supporting mass by contacting said supporting mass while in said reactor with a solution of sodium in liquid ammonia, and withdrawing vaporized ammonia from said reactor while preventing access of air and moisture into said reactor.

4. The process of claim 3 in which said supporting mass consists of a packing of glass wool.

5. The process of preparing a supported catalyst which comprises treating an inert non-porous supporting mass of extensive surface area with a solution of sodium in liquid ammonia and evaporating the ammonia, while preventing access of air and moisture to the treated material during evaporation.

6. A supported catalyst consisting essentially of glass wool having thereon an active film of substantially pure metallic sodium in the form deposited from solution in liquid ammonia.

GEORGE ALEXANDER MILLS.

No references cited.